Feb. 4, 1936.    J. L. PERKINS    2,029,385
MACHINE TOOL
Filed Jan. 19, 1935
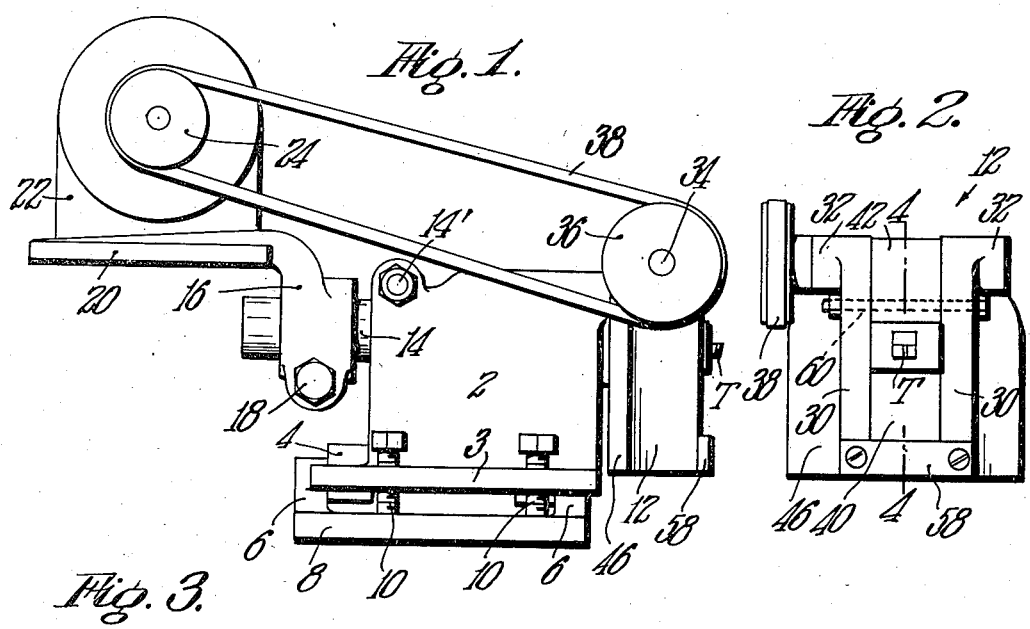
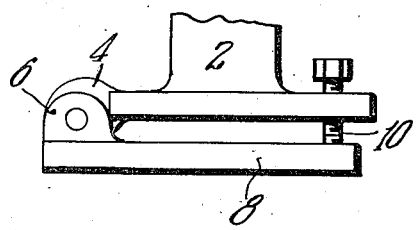
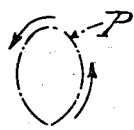
INVENTOR.
Julian L. Perkins
BY
ATTORNEY.

Patented Feb. 4, 1936

2,029,385

UNITED STATES PATENT OFFICE 2,029,385

MACHINE TOOL

Julian L. Perkins, West Springfield, Mass.

Application January 19, 1935, Serial No. 2,548

12 Claims. (Cl. 82—1)

This invention relates to improvements in machine tools.

One object of the invention is the provision of a machine having a tool carrier which is simultaneously oscillated and rocked so that a cutting tool carried thereby traverses a continuous path whereby it moves upwardly into contact with a piece of work and then away therefrom.

Another object of the invention is the provision of a machine of the class described which is simple in construction and capable of high speed operation whereby the greatest efficiency results.

It is desirable in machining metal parts to take a large number of small cuts rather than a fewer number of larger cuts. When such small cuts are taken, it is possible to perform very accurate work and by the taking of the small cuts it is possible to operate at high speed or so that the cuts are made in rapid succession and in that way the overall time of the machining operation is greatly reduced, which, together with the accuracy, is of course desirable.

The machine of this invention is adapted for broad application but it may well be used with a lathe or the like where the machine may be carried as by a cross slide and arranged to operate on work supported by a chuck or carried between centers of the lathe.

Various other novel features and advantages of the invention will be hereinafter more fully referred to in connection with the accompanying description of the preferred form of the invention, reference being had to the accompanying drawing wherein:

Fig. 1 is a side elevational view of the machine embodying the novel features of the invention;

Fig. 2 is a front elevational view of the machine shown in Fig. 1;

Fig. 3 is an end elevational view of the lower part of the machine shown in Fig. 1 to explain how it may be associated with the slide of a lathe;

Fig. 4 is a sectional elevational view on the line 4—4 of Fig. 2; and

Fig. 5 is a diagrammatic view showing the form of path through which the cutting tool is caused to travel.

Referring now to the drawing more in detail the invention will be fully described.

2 represents a support which may have an ear or ears 4 for pivoting to ears or lugs such as 6 of a plate 8 of the cross slide of a lathe or the like. Adjusting screws 10 in threaded engagement with a flange 3 of the support 2 abut the plate 8 and, by being adjusted relative to the flange 3, may cause the support 2 to be raised and lowered relative to the plate 8.

A head 12, later to be described in detail, is preferably adjustably associated with the support 2. This may be accomplished by a stud 14 extending rearwardly from the head which passes through a suitable bore of the support 2. The support is split in the well-known manner and a clamp bolt or bolts 14' associated with the support serve to clamp the member 14 thereto. As will be observed, the head may be moved back and forth relative to the support.

A bracket 16 is clamped, as by a bolt 18, to the stud 14. This bracket 16 has a supporting plate such as 20 on which is carried a motor 22 having a driving pulley 24.

The head 12 has spaced side plates or cheeks 30 with journal bearings 32 on their upper ends. A shaft 34 is rotatable in the bearings 32 and a pulley 36 is fixed to its outer end. A belt such as 38 engages the pulley 24 and the pulley 36 so that the shaft 34 is driven by the motor 22. The shaft 34 intermediate its ends and between the bearings 32 has a portion 35 which is eccentrically arranged relative to the main body of the shaft.

A tool carrier 40 has an upper part 42 in which the eccentric part 35 of the shaft is rotatable and is arranged for movements between the members 30. A tool T extends outwardly from the forward face of the carrier 40 as shown. A thrust member 44 is rigidly associated with a back plate 46 of the head 12 and its outer end extends into a recess 48 in the rear side of the carrier so that its forward end 50 and bearing surface 52 of the recess are in sliding engagement. Means to urge the carrier rearwardly consists of a spring 54 under compression in a recess 56 of the carrier and disposed behind a strip or the like 58 secured by screws 60 to the members 30.

As the shaft 34 is rotated in a counter-clockwise direction the upper end of the carrier is caused to rotate while the lower end is restrained by the thrust member and spring so that it slides and rocks. By this movement the tool T is caused to move rearwardly and downwardly and then forwardly and upwardly and then finally rearwardly so as to pass through a continuous closed path more or less in the form of an ellipse indicated generally in Fig. 5.

In Fig. 4 there is represented a piece of work W to be acted upon by the tool T. This piece of work may be carried by the chuck of a lathe or between the centers thereof with the machine of the invention associated with the bed or slide of the lathe. With the relation to the work W the tool T moves from the position shown in Fig. 4 rearwardly and downwardly to its lower position and then upwardly into the work and rearwardly away therefrom. In this way the cutting point of the tool is caused to come up into the work, make its cut and then pass outwardly, a very desirable cutting operation as where backing off is being done.

The eccentricity of the part 35 relative to the shaft may, of course, be varied within wide limits as may be the distance between shaft and thrust member, all to the end that the tool may be caused to travel in various paths, which, however, in all cases will be closed and continuous.

The thrust member co-operates with the carrier not only to bring about the movement of the tool through the continuous, and more or less elliptical, path but acts to withstand the thrust of the tool as it engages the work.

By arranging the eccentric part of the shaft relative to the main part thereof at not too great a degree of eccentricity, the up and down movement of the carrier may be short. Also its lateral movements will be correspondingly short. In this way it is possible to make rather light cuts in the work and due to the novel construction it is possible to operate the carrier at high speed and therefor make the cuts in very rapid succession.

To insure accuracy in operation the carrier is guided between the members 30 in such a way as to obviate lost motion. To provide the proper sliding clearance between the members 30 and carrier, a bolt 60' is provided which extends through cheeks 30 and through an opening 62 in the carrier and preferably out of contact therewith. A nut 68 on the bolt is provided to cause the bolt and nut to squeeze or clamp the members 30 so that they firmly hug the slide or carrier without interfering with its proper desired movement.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A machine of the class described comprising in combination, a support, a tool carrier slidable therein, means to impart a rotary movement to one end of said carrier and means at the other end of the carrier to limit movements thereof to rocking and sliding movements whereby a part of the carrier traverses a continuous substantially elliptical path.

2. A machine of the class described comprising in combination, a support, a tool carrier movable therein in a certain plane, a tool on said carrier, means to impart a rotary movement to one end of said carrier and restraining means acting on said carrier co-operating with the first-named means to cause the said tool to traverse a substantially elliptical path.

3. A machine of the class described comprising in combination, a support, means for guiding a carrier in movements in a certain plane, driving means at one end of the carrier to rotate said end and restraining means associated with a part of the support limiting movement of the said part of the carrier to rocking and sliding movements whereby a part of said carrier for supporting a tool traverses a continuous substantially elliptical path.

4. A machine of the class described comprising in combination, a head, a carrier slidable relative thereto, operating means connected to one part of the carrier adapted to impart a rotary movement thereto, means engageable with another part of said carrier adapted to cause the said part to rock as the said one part is rotated whereby a part of the carrier is moved through a continuous substantially elliptical path, a support and adjustable connections associated with said support and head.

5. A machine of the class described comprising in combination, a support, a movable carrier, a tool on said carrier, guiding means on said support engaging the carrier and guiding it in movements in a certain plane, a rotatable driver engaging a part of said carrier for imparting a rotary movement to said part, restraining means engaging another part of said carrier limiting movements thereof to rocking movements while its other part is rotated whereby the carrier traverses a closed substantially elliptical path.

6. A machine of the class described comprising in combination, a support, a movable carrier, a tool on said carrier, guiding means on said support engaging the carrier and guiding it in movements in a certain plane, a rotatable driver engaging a part of said carrier for imparting a rotary movement to said part, restraining means engaging another part of said carrier limiting movements thereof to rocking and sliding movements while its other part is rotated whereby the carrier traverses a closed substantially elliptical path.

7. A machine of the class described comprising in combination, a support, spaced guides thereon, a tool carrier movable between said guides, a tool on said carrier, a rotatable operating member having a driving part eccentrically disposed relative to the axis of rotation of the said member, connections between said driving part and a part of said carrier, restraining means associated with said support and another part of said carrier limiting movements thereof to rocking and sliding movements whereby said tool traverses a closed substantially elliptical path as the first-named part is acted upon by said driving part.

8. A machine of the class described comprising in combination, a support, spaced guides thereon, a tool carrier movable between said guides, a tool on said carrier, a rotatable operating member having a driving part eccentrically disposed relative to the axis of rotation of the said member, connections between said driving part and a part of said carrier, restraining means associated with said support and another part of said carrier limiting movements thereof to rocking and sliding movements whereby the said tool traverses a closed substantially elliptical path as the first-named part is acted upon by said driving part, the said restraining means including a thrust member against which the carrier abuts and yielding means urging the carrier towards the said thrust member.

9. A machine of the class described comprising in combination, a support, spaced guides thereon, a carrier movable therebetween, a rotatable shaft, eccentric connections between a part of the carrier and said shaft, a thrust member on said support on which another part of said carrier slides, and yieldable means urging said other part of the carrier towards said thrust member.

10. A machine of the class described comprising in combination, a support, spaced guides thereon, a carrier movable therebetween, a rotatable shaft having an eccentrically disposed part journalled in the upper end of said carrier, a tool on said carrier, a thrust member, the lower of the carrier being slidable on said thrust member and spring means acting on the carrier and urging the lower end thereof against said thrust member whereby the lower end of the carrier is restrained to rocking and sliding movements.

11. A machine of the class described comprising in combination, a support, a head adjustable relative to said support, a shaft rotatable in said head, a tool carrier guided for movements in said head, a driver on said shaft eccentrically disposed, connections between an end of said carrier and driver, a thrust member on said head adjacent the lower end of the carrier and yielding means acting on said carrier urging the lower end thereof against said thrust member whereby as it is driven by said driver a part thereof traverses a closed substantially elliptical path.

12. A machine of the class described comprising in combination, a support, a tool carrier mounted for rocking and sliding movements in said support, means acting on a part of said slide to cause the said part to rotate and another part of said slide to slide back and forth, and means acting on another part of said slide restricting movements of said part to sliding movements whereby another part of the slide traverses a continuous closed and curved path.

JULIAN L. PERKINS.